F. BROWN.
Pulley.
No. 219,207. Patented Sept. 2, 1879.
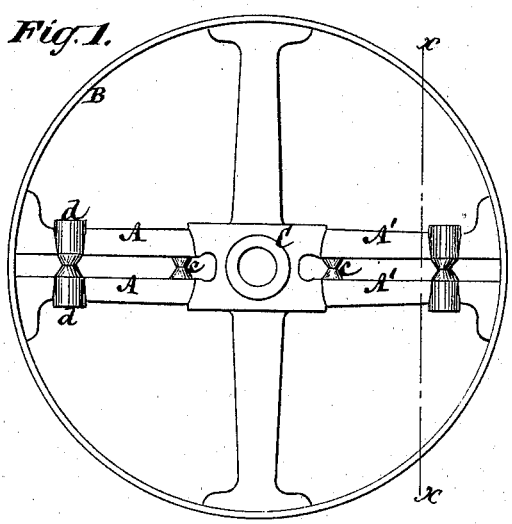
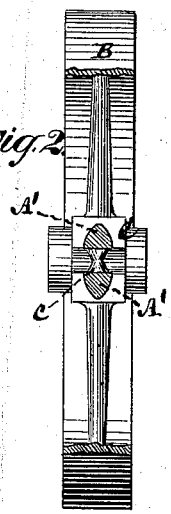
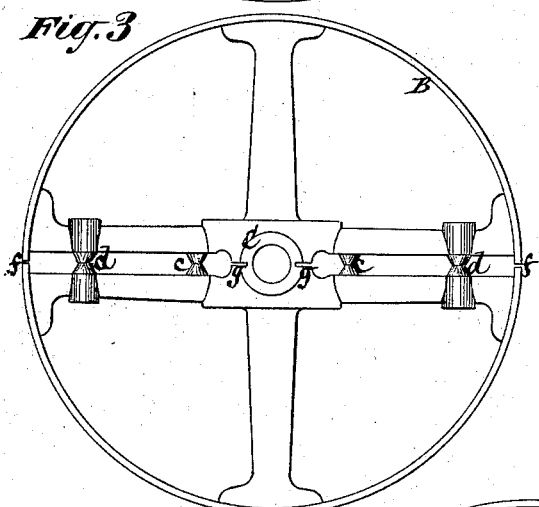
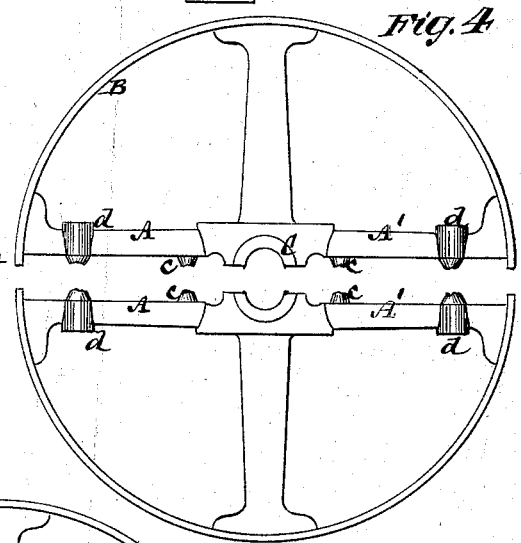
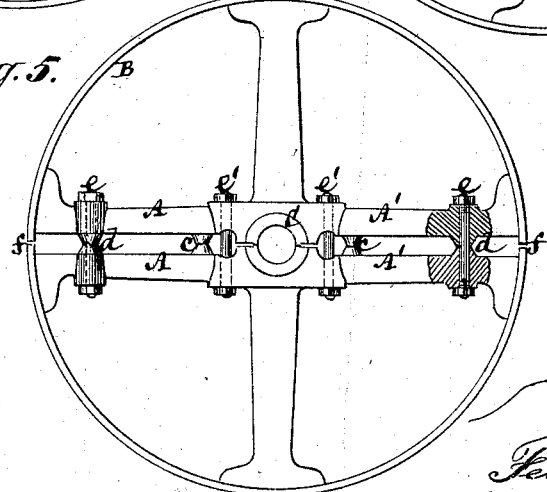
Witnesses
John Becker
Thomas E. Birch.
Inventor
Felix Brown

UNITED STATES PATENT OFFICE.

FELIX BROWN, OF NEW YORK, N. Y.

IMPROVEMENT IN PULLEYS.

Specification forming part of Letters Patent No. 219,207, dated September 2, 1879; application filed June 14, 1879.

*To all whom it may concern:*

Be it known that I, FELIX BROWN, of the city and State of New York, have invented certain new and useful Improvements in Pulleys, of which the following is a description, reference being had to the accompanying drawings, forming part of this specification.

The object of my invention is to construct a cast-metal pulley which, without changing the pattern, may be used for either a whole or a split pulley, in which the arms are so arranged that when used as a split pulley they serve to support the rim at the points where it is divided.

The invention consists in a cast-metal pulley having arms contiguously arranged in pairs on opposite sides of its axis, the arms of each pair being parallel with each other, and one or more grooved, notched, or tapered braces between the arms of each pair, to provide for the ready breaking of said braces when splitting the pulley. One or more of the said grooved or notched braces on each side of the axis is preferably made hollow, to receive through them the bolts for securing the parts of the pulley together.

Referring to the accompanying drawings, Figure 1 represents a side view of a whole pulley constructed in accordance with my invention; Fig. 2, a transverse section of the same on the line $x\,x$; Fig. 3, a side view thereof during the act of its being changed from a whole pulley to a split one; Fig. 4, a side view of said pulley after it has been split or divided; and Fig. 5, a further side view after the split portions of the pulley have been secured or bolted together.

The pulley, as here represented, is constructed with several arms, two pairs of which, on opposite sides of the axis of the pulley, consist of arms A A and A′ A′, arranged parallel with and in such close proximity to each other that they readily admit of being secured together, and of being separated when required, as hereinafter described.

The whole pulley, including the rim B, its arms, and hub C, is cast in a single piece, and does not require cores for dividing it, or any fitting or planing of the two halves of the pulley together to construct a split pulley out of a whole one when it is required to fit the pulley laterally over a shaft instead of endwise along it.

The arms A A and A′ A′ are connected, respectively, by one or more projections, $c\,d$, forming braces, at any suitable distance or distances from the hub, between the latter and the rim of the pulley. These braces $c\,d$ are tapered in direction of their length in such manner that they form notches or grooves between the arms of each pair of arms A A and A′ A′, thereby constituting readily breakable portions or connections when it is required to divide the pulley, and one of them, $d$, on opposite sides of the axis and near the periphery of the pulley, is made hollow to receive a bolt, $e$, through it, for the purpose of uniting the halves of the divided pulley together, as shown in Fig. 5. These projections $c\,d$ between the arms A A and A′ A′ serve as tension-braces between said arms when the pulley is a whole one, as shown in Figs. 1 and 2, and as thrust-braces when the pulley is a split one and its halves are bolted together, as shown in Fig. 5.

To convert the pulley from a whole one to a split one, it is only necessary to saw or plane through the rim B, as at $f$, Fig. 3, between the arms A A and A′ A′, or to partially divide said rim, and, furthermore, to partially divide, by planing, sawing, or otherwise in the same line or direction, the hub C on opposite sides of the eye, either from the outside, as at $g$ in Fig. 3, or from the inside of the eye, as may be desired. Wedges are then introduced into these divisions or cuts $f\,g$, and pressure or blows applied to said wedges to split said pulley in the direction of said cuts, the grooved, notched, or tapered braces $c\,d$ between the arms A A and A′ A′ presenting but moderate resistance, and readily breaking, as shown at Fig. 4.

As the pulley is divided between the pairs of parallel arms, the periphery of the pulley is well supported at its points of division; and as the bolt nearest the periphery on each side of the axis passes through the hollow brace, the springing of the pulley by screwing up the said bolts is prevented. Said braces admit, too, of the arms A A and A′ A′ being made lighter without exposing them to spring, and after being broken to split the pulley, they form their own joint.

Bolts may be passed through either or both of the braces c d, and in some cases one of said braces be altogether omitted, or there may be more than two of them on opposite sides of the axis of the pulley.

I claim—

1. A cast-metal pulley having arms contiguously arranged in pairs on opposite sides of its axis, the arms of each pair being parallel with each other, and one or more grooved, notched, or tapered braces between the arms of each pair, to provide for the ready breaking of said braces when splitting the pulley, substantially as specified.

2. The combination, with the two pairs of adjacent arms on opposite sides of the axis of the pulley, the arms of each pair being parallel with each other, of one or more notched or grooved hollow braces between the arms of each pair, essentially as and for the purposes herein set forth.

3. The combination, with the rim B and hub C, having splits or cuts in them in line with each other, of the two pairs of adjacent parallel arms A A and A′ A′, one or more transversely-fractured hollow braces between said arms, and one or more bolts passing through said braces, substantially as specified.

FELIX BROWN.

Witnesses:
 FREDK. HAYNES,
 THOMAS E. BIRCH.